United States Patent [19]

Bolton et al.

[11] Patent Number: 5,438,024
[45] Date of Patent: * Aug. 1, 1995

[54] TRANSPARENT, FIXED TINT GLASS LENSES

[75] Inventors: James R. Bolton, LeRoy; J. Raymond Hensler, Rochester, both of N.Y.

[73] Assignee: Bausch & Lomb Incorporated, Rochester, N.Y.

[*] Notice: The portion of the term of this patent subsequent to Nov. 22, 2011 has been disclaimed.

[21] Appl. No.: 284,716

[22] Filed: Aug. 2, 1994

Related U.S. Application Data

[63] Continuation of Ser. No. 188,532, Jan. 28, 1994, Pat. No. 5,366,940.

[51] Int. Cl.⁶ .............................................. C03C 3/085
[52] U.S. Cl. .................................. 501/55; 501/65; 501/66; 501/67; 501/69; 501/71
[58] Field of Search ...................... 501/55, 65, 66, 67, 501/68, 69, 71

[56] References Cited

U.S. PATENT DOCUMENTS

| | | | |
|---|---|---|---|
| 2,581,440 | 1/1952 | Pinlus | 501/71 |
| 2,688,560 | 9/1954 | Armistead | 501/65 |
| 2,688,561 | 9/1954 | Armistead | 501/69 |
| 3,010,836 | 11/1961 | Upton | 501/67 |
| 3,294,556 | 12/1966 | Harrington | 501/71 |
| 3,561,985 | 2/1971 | Hagedorn | 501/71 X |
| 3,563,771 | 2/1971 | Tung | 501/71 X |
| 3,790,260 | 2/1974 | Boyd | 351/159 |
| 4,565,791 | 1/1986 | Boudot | 501/56 |
| 4,768,859 | 9/1988 | Kasori | 385/144 |
| 4,824,806 | 4/1989 | Yokoi | 501/35 |
| 5,077,240 | 12/1991 | Hayden | 501/67 |
| 5,089,444 | 2/1992 | Hattori | 501/9 |
| 5,198,393 | 3/1993 | Grebe | 501/65 |
| 5,242,869 | 9/1993 | Tarumi | 501/56 |
| 5,256,607 | 10/1993 | Kerko | 501/65 |

FOREIGN PATENT DOCUMENTS

| | | | |
|---|---|---|---|
| 2509187 | 11/1975 | Germany | 501/71 |
| 0072911 | 6/1975 | Japan | 501/71 |

*Primary Examiner*—Mark L. Bell
*Assistant Examiner*—David Sample
*Attorney, Agent, or Firm*—Salvatore P. Pace

[57] ABSTRACT

A transparent, fixed tint glass lens is provided having a thickness of between about 1.0 mm and about 1.8 mm and which is derived from an alkali silicate composition containing, in terms of weight percent on an oxide basis, at least 6.2% iron oxides, at least 0.03% cobalt oxide and at least 0.12% nickel oxide in the presence of an oxidizing agent such as arsenic oxide. Preferably, the lenses have a transmittance of not more than 1% of ultraviolet radiation at 380 nm.

14 Claims, No Drawings

TRANSPARENT, FIXED TINT GLASS LENSES

This is a continuation of application Ser. No. 08/188,532 filed on Jan. 28, 1994, now U.S. Pat. No. 5,366,940.

BACKGROUND OF THE INVENTION

1. Field of the Invention

The present invention relates to transparent, fixed tint glass lenses and, more particularly, relates to a fixed tint lens derived from an alkali silicate composition containing high concentrations of colorants and thicknesses of between about 1.0 mm to about 1.8 mm.

2. Description of the Art

Transparent fixed tint lenses have been marketed in sunglasses for many years by many different companies. For example, the assignee of the present application has marketed 2.2 mm thick glass lenses sold under the registered trademark G-15 since the 1940's. These lenses provide the true color vision of a neutral gray lens and are typically air-tempered to improve their impact resistance. The G-15 lenses are known for their unique color which provides true color vision essentially equivalent to a perfect neutral lens while, at the same time, avoiding the flat and dull appearance of a perfectly neutral lens. This is achieved by departing slightly from a neutral spectral transmission towards a slight green. The slight green transmission is due to a blue and red absorption slightly beyond the perfectly neutral spectral absorption. This absorption leads to a higher contrast or a "livelier" view as compared to the view through a perfectly neutral lens. Many sunglass wearers prefer this lively view as opposed to the flat view often associated with conventional neutral gray lenses. It is the precise control of the colorants in the glass, namely the Group VIII metal oxides such as the iron, cobalt and nickel oxides, which allow the perfect balance of neutrality and green color. As a result, the lively gray G-15 lens has been commercially successful and millions of sunglasses are sold each year containing these lenses.

While the 2.2 mm thick glass lenses have been commercially successful, there are some drawbacks associated with glass lenses in general. Conventional glass sunglass lenses typically have a thickness from 2.0 mm to greater than 2.2 mm thick. The weight of such glass lenses is considered a disadvantage by some sunglass wearers. One approach to address this weight concern has been to substitute plastic lenses for the glass lenses since the weight of comparable plastic lenses are substantially less than their glass counterparts. However, this approach has not proved to be entirely satisfactory since the plastic lenses are much more prone to scratching, have imperfect clarity, and occasionally have unstable colorants. Attempts to produce a thinner glass lens having substantially the same optical properties as the present 2.2 mm thick G-15 lens utilizing conventional Beer's Law to scale the colorant concentrations was not successful. This approach lead to glass lenses having reduced transmittance (too dark) and a dominant wave length shifted toward the yellow-green (too yellow-green).

Glass lenses, as disclosed herein, have now been developed which are thinner than conventional lenses, have the associated reduced weight, and are suitable for use as sunglasses lenses or, in certain applications, as ophthalmic lenses. However, it has been found that these lenses must have precise concentrations of colorants and oxidizing agents to achieve desirable visual characteristics. The lenses of this invention have a thickness of between about 1.0 mm and about 1.8 mm and are derived from an alkali silicate composition containing at least 6.2% by weight iron oxides, at least 0.03% by weight cobalt oxide and at least 0.12% by weight nickel oxide and an oxidizing agent. These lenses preferably have a transmittance of not more than 1% of ultraviolet radiation at 380 nm. While many sunglasses have been marketed with neutral gray, fixed tint glass lenses, none of these lenses have optical properties or compositions similar to the present lenses and have a thickness of between about 1.0 mm and about 1.8 mm.

Accordingly, the present invention is directed to thin glass lenses suitable for use in sunglasses and fixed tint ophthalmic lenses which exhibit a lively gray, fixed tint transmittance, unlike those previously available.

SUMMARY OF THE INVENTION

The present invention is directed to lenses having substantially all the optical characteristics of a "lively gray" lens such as 2.2 mm thick G-15 lens when finished to thicknesses from about 1.0 mm to about 1.8 mm. The characteristics of particular focus are color, transmittance level in the visible spectral region, and transmittance level in the ultraviolet spectral region.

Accordingly, the present invention is directed to a transparent, fixed tint glass lens derived from an alkali silicate glass composition containing at least 6.2% by weight iron oxides, at least 0.03% by weight cobalt oxide and at least 0.12% nickel oxide as the essential colorants in the presence of an oxidizing agent. These glass lens compositions have a thickness of between about 1.0 mm and about 1.8 mm, preferably do not transmit more than 1% of ultraviolet radiation at a wavelength of 380 nm and exhibit a lively gray, fixed tint visual transmittance.

DETAILED DESCRIPTION OF THE INVENTION

The present invention is directed to transparent, lively gray, fixed tint glass lenses having a thickness of between about 1.0 mm and about 1.8 mm and which preferably do not transmit more than 1% of ultraviolet radiation at a wavelength of 380 nm. The glass compositions from which the lenses are derived are alkali silicate compositions and contain at least 6.2% by weight iron oxides, preferably at least 6.3% by weight iron oxides, at least 0.03% by weight cobalt oxide and at least 0.12% by weight nickel oxide as the essential colorants in the presence of a suitable oxidizing agent. While minor amounts of other oxides having absorbing properties can be employed, the concentration or effect of such oxides should be limited so as not to have any substantially measurable effect on the spectral transmittance of the present lenses. Preferably, the glass composition will be essentially free from the presence of additional colorants having a measurable effect on the spectral transmittance.

In a preferred embodiment of the present invention, the glass lens has a thickness of between about 1.0 mm and about 1.8 mm, a transmittance of not more than 1% of ultraviolet radiation at a wavelength of 380 nm and a composition, expressed in terms of weight percent on an oxide basis, consisting essentially of:

| | |
|---|---|
| $SiO_2$ | 65.0%–72.0% |

-continued

| | |
|---|---|
| Al₂O₃ | 0%–2% |
| Na₂O | 5%–15% |
| K₂O | 5%–10% |
| ZnO | 4%–8% |
| B₂O₃ | 0%–6% |
| Fe₂O₃ | 6.2%–9.0% |
| Co₃O₄ | 0.03%–0.06% |
| NiO | 0.12%–0.30% |
| As₂O₃ | 0.1%–0.5% |

It should be understood that the concentrations of the individual metal oxides, and particularly the iron oxides, nickel oxide and cobalt oxide colorants, varies depending upon the final thickness of the lens. For example, to maintain equivalent transmittance, thinner lenses require a higher concentration of colorants within the ranges described above.

Table I lists glass compositions (experimental melts) of 1.8 mm and 1.0 mm lens of the present invention prior to chem-tempering. The compositions are expressed in terms of parts by weight on the oxide basis. The actual batch ingredients can consist of any materials, which, when melted together, will be convened into the desired oxides in proper proportions. In preparation of the glass compositions (experimental melts) as shown in Table I, the batch ingredients were weighed, ball milled to obtain a homogeneous mixture, and then charged into a platinum crucible which was placed in a furnace at about 1450° C. for about 4 hours in order to melt the ingredients. Upon completion of melting, a platinum stirrer was used to mix the mixture to insure homogeneity for about an additional 4 hours. Each melt composition was then east into a steel mold to yield rectangular plates and annealed by cooling at a controlled rate. Samples were cut from the annealed glass plates, ground and polished to the desired thickness and the spectral transmittance of each sample was measured in a spectrophotometer. Hunter color coordinates were calculated from the spectrophotometric measurements.

As will be clear to those skilled in the art, the above description is directed to a laboratory melting and forming process (experimental melts). Glass compositions complying with the parameters and requirements of the present invention can easily be prepared in larger quantities using conventional glass melting tanks and glass forming equipment and techniques as are well known.

The color and the luminous transmittance of the 2.2 mm thick air-tempered G-15 glass lens have been quantified through a known measurement scheme to specify the lens specifications for the lively gray lens of this invention. Luminous transmittance is the perceived visible transmittance associated with lightness or darkness as defined by CIE (1931). The Hunter coefficients define the color in terms of yellow-blue (a-factor) and red-green b-factor). The scheme is useful for characterizing the transmittance and color characteristics because it is well known that a sphere of color space defined by a, b, and luminous transmittance with a radius equal to one represents the space within which the average observer cannot distinguish color and transmittance differences. Lenses within a sphere of radius 4 have been found to show the desired characteristics. A 2.2 mm thick air-tempered G-15 lens has a luminous transmittance (Y) of 14.5%, a Hunter "a" value of −5.5, a Hunter "b" value of 5.2. The condition for achieving a lively gray lens is:

$\Delta E \leq 4$ when:

$$\Delta E = \sqrt{[(14.5 - Y)(0.93)]^2 + [-5.5 - a]^2 [5.2 - b]^2}$$

Thus, the present lenses will have a "Y" value of between 10.2 and 18.8, an "a" value of between −1.5 to −9.5 and a "b" value of between 1.2 and 9.2, provided that $\Delta E < 4$. The target for ultraviolet radiation transmittance at 380 nm ($T_{380}$) was set at not more than 1% to represent essential elimination of the ultraviolet radiation in the performed embodiment.

It was found that the luminous transmittance Of G-15 type glass lenses decreases upon air-tempering and the color becomes more yellow-green. Of particular interest is the effect of air-tempering on the ultraviolet transmittance as quantified by the transmittance at 380 nm ($T_{380}$). The $T_{380}$ decreased by a factor of about three after air-tempering This is advantageous in view of the health concern about ultraviolet light being a contributing cause of cataracts.

However, air-tempering processes are generally not employed with the lenses of this invention. It is preferred to use a chem-tempering process since air-tempering processes generally do not provide the desired impact resistance requirements for lenses having a thickness of less than 2.0 mm. Accordingly, conventional them-tempering processes, i.e. molten alkali nitrate baths, are used with the lenses of this invention. While air-tempering reduces $T_{380}$ for the 2.2 mm thick lenses, chem-tempering increases $T_{380}$ for thinner lenses. In order to obtain the preferred limited ultraviolet transmittance, it is necessary to compensate for this chem-tempering effect prior to tempering. To conform to the 1% $T_{380}$ maximum in the tempered lens, it is necessary to maintain a maximum of 0.7% at $T_{380}$ in the untempered glass composition. Preferably, to achieve a $T_{380}$ of not more than 1%, the untempered glass composition should have a $T_{380}$ of not more than 0.7%.

The iron oxides are generally present in the glass compositions in two forms; i.e., trivalent iron ($Fe^{3+}$) and divalent iron ($Fe^{2+}$). The trivalent iron is believed to reduce the transmittance primarily in the ultraviolet and in the blue spectral regions while the divalent iron is believed to reduce the transmittance primarily in the red and infrared spectral regions. Increased concentration of trivalent iron tends to make the glass more yellow-green while increased concentrations of divalent iron tends to make the glass more blue-green. The ratio of divalent to trivalent iron is influenced by various factors including the total iron oxide(s) concentration, the atmosphere surrounding the melt, the temperature at which the melting is carried out, and other components in the melt which can be active in reduction/oxidation reactions.

Arsenic oxide functions in the glass compositions as an oxidizing agent, as well as a fining agent, and has been shown to have an influence on the transmittance level. The presence of arsenic oxide has been shown to result in an increased ratio of trivalent to divalent iron thereby reducing the ultraviolet transmittance at 380 nm. Examples #7 and #8 in Table I show the effect of two levels of arsenic oxide. The glass with the higher arsenic oxide (Example #8) has a lower $T_{380}$ and is more yellow-green than Example #7. Although arsenic oxide is the preferred oxidizing agent, other oxidizing agents including but not limited to antimony oxide and nitrates, such as alkali nitrates, can be employed.

Calculation by Beer's Law of the concentration of colorants required to provide the equivalent transmittance to the 2.2 mm G-15 lens in the thinner lens is not effective when applied to the colorant oxides. The concentrations which were calculated to provide the desired color in the thinner lens using Beer's Law were found to depart significantly from the desired transmittance.

To achieve the required color and transmittance in the thin lenses, concentration of the iron, cobalt and nickel oxides are increased to darken (decrease luminous transmittance) the glass composition. Beer's Law extrapolation of the iron oxides level results in a glass composition which is too dark. The glass composition can be made lighter (increased luminous transmittance) by decreasing the iron oxides concentration. However, decreasing the iron oxides concentration will increase the $T_{380}$ as the glass gets lighter. The lower $T_{380}$ is restored with the addition of arsenic oxide as described above. The nickel oxide concentration is increased to compensate for a color which is too yellow-green or is decreased to compensate for a color which is less yellow-green. The cobalt oxide concentration is increased to compensate for a color which is too red or is decreased to compensate for a color which is too blue. While the decreased concentration of any of the colorants will tend to make the glass lighter, the colorants and the arsenic oxide must be combined in the precise concentrations described herein to provide the desired color, transmittance and $T_{380}$.

In order to obtain the preferred spectral transmission of the present lenses, the weight ratio of iron oxide to cobalt oxide should be from about 140:1 to about 250:1. The weight ratio of iron oxide to nickel oxide should be from about 25:1 to about 50:1. The weight ratio of nickel oxide to cobalt oxide is preferably from about 3.5:1 to about 5:1.

The critical ranges of the iron, nickel, and cobalt oxide colorants and of the arsenic oxide have been described. The other glass components can be modified significantly as known to one skilled in the art providing the concentration of colorants and oxidants achieve the same transmittance and color.

For example, components other than the iron, cobalt and nickel oxides may be present in the glass to perform conventional and customary functions. The $SiO_2$ is the network former or "backbone" of the glass. $Al_2O_3$ plays a role which extends that of $SiO_2$ as network former although it is not normally used alone in this role. $Na_2O$ and $K_2O$ aid in providing sufficient fluidity in the glass melt to allow effective homogenization. While either $Na_2O$ or $K_2O$ alone can provide the required fluidity, mixing the two results in a melt which changes more gradually from a liquid to a solid and is therefore easier to form into lens blanks. ZnO modifies the glass structure and provides good resistance to chemicals. It can be largely substituted by CaO or MgO without substantially changing the resulting glass. $As_2O_3$, in addition to its role in visible and ultraviolet transmittance, plays a role as a "fining agent"; i.e., it aids in the elimination of bubbles.

While preferred embodiments of the present invention have been fully illustrated and described herein, it will be evident and understood by those of ordinary skill in the art that changes and modifications may be made therein without departing from the spirit or scope of the invention. It is to be understood that this invention is not intended to be limited by the embodiments and figures set forth herein, but shall include all modifications, variations, and equivalents which fall within the scope of the attached.

TABLE I

| Wt. % | 1 | 2 | 3 | 4 | 5 | 6 | 7 | 8 | 9 | 10 | 11 |
| --- | --- | --- | --- | --- | --- | --- | --- | --- | --- | --- | --- |
| $SiO_2$ | 68.92 | 69.04 | 69.16 | 68.78 | 68.80 | 68.80 | 68.86 | 68.88 | 67.70 | 67.13 | 67.62 |
| $Al_2O_3$ | 0.50 | 0.50 | 0.50 | 0.50 | 0.50 | 0.50 | 0.50 | 0.50 | 0.49 | 0.49 | 0.49 |
| $Na_2O$ | 9.46 | 9.47 | 9.49 | 9.44 | 9.44 | 9.44 | 9.45 | 9.44 | 9.28 | 9.21 | 9.29 |
| $K_2O$ | 8.09 | 8.10 | 8.11 | 8.07 | 8.07 | 8.07 | 8.08 | 8.07 | 7.93 | 7.87 | 7.92 |
| ZnO | 6.05 | 6.06 | 6.08 | 6.04 | 6.04 | 6.04 | 6.05 | 6.04 | 5.94 | 5.89 | 5.94 |
| $Fe_2O_3$ | 6.67 | 6.50 | 6.34 | 6.85 | 6.85 | 6.85 | 6.75 | 6.75 | 8.19 | 9.01 | 8.30 |
| NiO | 0.165 | 0.165 | 0.165 | 0.165 | 0.145 | 0.140 | 0.165 | 0.165 | 0.282 | 0.223 | 0.282 |
| $Co_3O_4$ | 0.034 | 0.034 | 0.034 | 0.034 | 0.034 | 0.034 | 0.034 | 0.034 | 0.058 | 0.058 | 0.058 |
| $As_2O_3$ | 0.12 | 0.12 | 0.12 | 0.12 | 0.12 | 0.12 | 0.12 | 0.18 | 0.12 | 0.12 | 0.12 |
| Thickness | 1.8 | 1.8 | 1.8 | 1.8 | 1.8 | 1.8 | 1.8 | 1.8 | 1.0 | 1.0 | 1.0 |
| % T (Y) | 14.2 | 14.3 | 14.3 | 13.1 | 13.8 | 15.1 | 13.7 | 14.0 | 14.5 | 14.7 | 14.4 |
| Hunter a | −5.82 | −5.61 | −5.54 | −5.80 | −6.54 | −6.66 | −5.79 | −6.06 | −4.57 | −5.72 | −4.64 |
| Hunter b | 5.43 | 4.98 | 4.39 | 5.80 | 6.71 | 6.69 | 5.70 | 6.67 | 4.33 | 8.19 | 5.18 |
| % $T_{380}$ | 0.4 | 0.5 | 0.6 | 0.3 | 0.2 | 0.3 | 0.3 | 0.2 | 0.7 | 0.2 | 0.6 |
| Delta E | 0.48 | 0.31 | 0.81 | 1.46 | 1.95 | 1.97 | 0.94 | 1.64 | 1.27 | 2.99 | 0.87 |

What is claimed is:

1. A transparent, fixed-tint glass lens derived from an alkali silicate glass composition containing at least 6.3% by weight iron oxides, at least 0.03% by weight cobalt oxides and at least 0.12% by weight nickel oxides as the essential colorants in the presence of an oxidizing agent, said lens having a thickness of 1.0 mm to 1.8 mm.

2. The lens of claim 1 wherein the oxidizing agent is $As_2O_3$.

3. The lens of claim 1 having a thickness of 1.0 mm.

4. The lens of claim 1 having a thickness of 1.8 mm.

5. The lens of claim 1 wherein the composition also contains silicon oxides, aluminum oxides, sodium oxides, potassium oxides, and zinc oxides.

6. The lens of claim 5 wherein the composition contains 4 to 8% by weight of ZnO.

7. The lens of claim 1 wherein the weight ratio of iron oxide to cobalt oxide is from about 140:1 to about 250:1, the weight ratio of iron oxide to nickel oxide is from about 25:1 to about 50:1, and the weight ratio of nickel oxide to cobalt oxide is from about 3.5:1 to about 5:1.

8. A tinted glass lens which, at a thickness of from 1.0 to 1.8 mm does not transmit more than 1% of ultraviolet radiation at a wavelength of 380 nm, said lens derived from an alkali silicate glass composition containing at least 6.3% by weight iron oxides, at least 0.03% by weight cobalt oxides and at least 0.12% by weight nickel oxides as the essential colorants and has at least 0.1% by weight arsenic oxide.

9. The lens of claim 8 wherein the composition is essentially free from the presence of additional colorants having a measurable effect on the spectral transmission.

10. Sunglasses using at least one tinted glass lens of claim 8.

11. The lens of claim 8 having a thickness of 1.8 mm.

12. The lens of claim 8 having a thickness of 1.0 mm.

13. The lens of claim 8 wherein said lens is a transparent, lively gray, fixed tint lens having a luminous transmittance of between 10.2 to 18.8, a Hunter "a" value of between −1.5 and −9.5 and a Hunter "b" value of between 1.2 and 18.8 provided that ΔE is not more than 4 when $$\Delta E = \sqrt{[(14.5 - Y)(0.93)]^2 + [-5.5 - a]^2 [5.2 - b]^2}\ .$$

14. The lens of claim 8 wherein the weight ratio of iron oxide to cobalt oxide is from about 140:1 to about 250:1, the weight ratio of iron oxide to nickel oxide is from about 25:1 to about 50:1, and the weight ratio of nickel oxide to cobalt oxide is from about 3.5:1 to about 5:1.

* * * * *

UNITED STATES PATENT AND TRADEMARK OFFICE
CERTIFICATE OF CORRECTION

PATENT NO. : 5,438,024
DATED : August 1, 1995
INVENTOR(S) : James R. Bolton, et. al.

It is certified that error appears in the above-indentified patent and that said Letters Patent is hereby corrected as shown below:

Column 3, line 23, change "convened into" to -- converted into --.

Column 3, line 34, change "east" to -- cast --.

Column 4, line 27, change "them-tempering" to -- chem-tempering --.

Columns 5 and 6, Table I, under the heading "3" at line "% T (Y)", change "14.3" to -- 14.5 --

Columns 5 and 6, Table I, under the heading "10" at line "Hunter b", change "8.19" to -- 8.18 --.

Signed and Sealed this

Second Day of July, 1996

*Attest:*

BRUCE LEHMAN

*Attesting Officer*   Commissioner of Patents and Trademarks